Oct. 6, 1953 — W. A. BEDFORD, JR — 2,654,411
BOLT WITH CLIP RETAINING MEANS
Filed Sept. 29, 1951
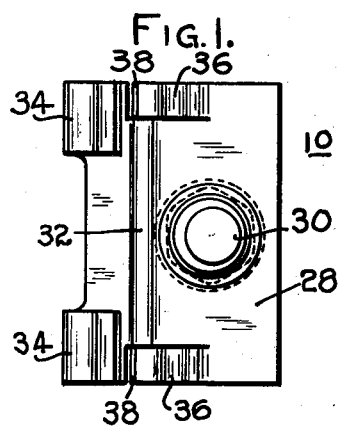
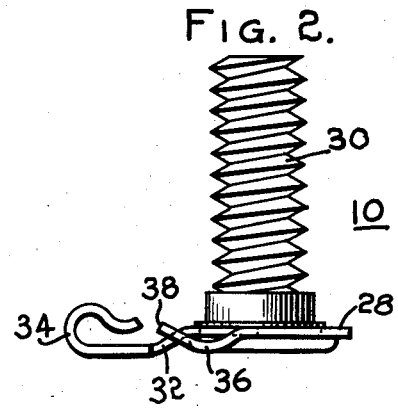
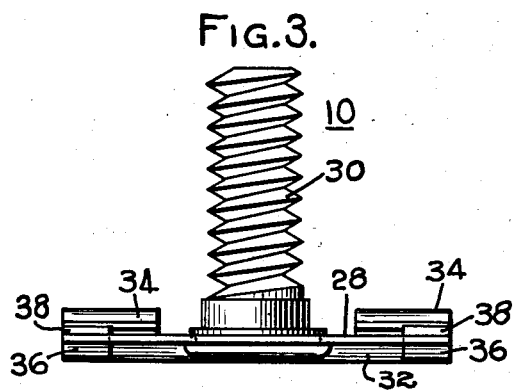
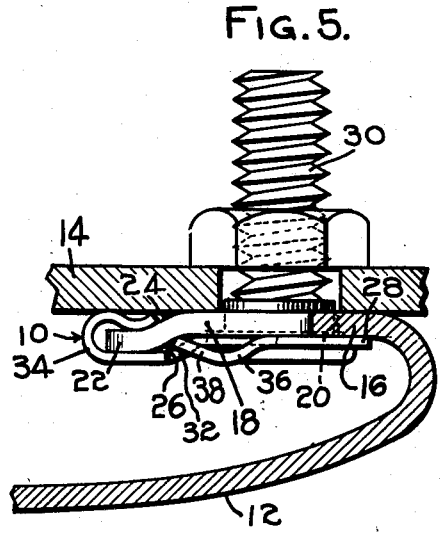
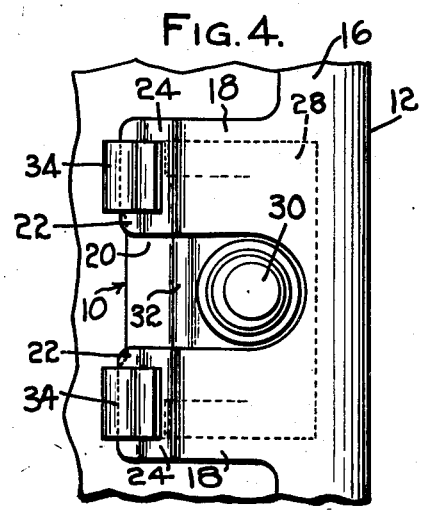
INVENTOR:
WILLIAM A. BEDFORD JR.,
BY Robert E Ross
AGENT.

Patented Oct. 6, 1953

2,654,411

UNITED STATES PATENT OFFICE 2,654,411

BOLT WITH CLIP RETAINING MEANS

William A. Bedford, Jr., North Scituate, Mass., assignor to United-Carr Fastener Corporation, Cambridge, Mass., a corporation of Massachusetts Application September 29, 1951, Serial No. 248,962

3 Claims. (Cl. 151—41.75)

This invention relates generally to fastening devices, and has particular reference to a fastener adapted for assembly onto the edge of a sheet metal member to enable the member to be attached to a support.

In the assembly of automobiles and the like, it is frequently necessary for certain exterior members formed of relatively thin sheet metal to be attached to some portion of the structure in such a manner that the fastening means is not visible. In situations where the portion of the member which must be fastened to the structure is a flanged edge portion bent back on itself so as to be spaced only a short distance from the main body of the member, there is usually insufficient distance between the flange and the main body of the member to allow a nut to be inserted therebetween for engagement with a bolt, nor is there sufficient space to allow a flat headed bolt to be inserted through an opening in the flange. The provision of slots extending from the edge of the flange for the bolt is not entirely satisfactory, since such attachment does not hold the member securely against vibration tending to move the member longitudinally of the slots, and there is the further difficulty of preventing rotation of the bolt during assembly.

The object of the invention is to provide a fastening device carrying a bolt which is adapted for assembly onto the edge of a sheet metal member to securely retain the bolt in position for assembly with a support.

A further object of the invention is to provide a fastener for assembly onto a panel edge which is offset from the plane of the panel to provide a shoulder parallel to the edge, in which hook means is provided on the fastener for engaging the offset edge portion, and tongue means is provided on the fastener for abutting against the shoulder portion.

Other objects of the invention will, in part, be obvious, and will, in part, appear hereinafter.

In the drawing:

Fig. 1 is a top plan view of a fastening device embodying the features of the invention;

Fig. 2 is a view in side elevation of the fastener of Fig. 1;

Fig. 3 is a view of the fastener of Fig. 2 as seen from the left side;

Fig. 4 is a top plan view of the fastener of Fig. 1 assembled onto a molding; and Fig. 5 is a view in section of the assembled fastener and molding attached to a support.

Referring to the drawing, there is illustrated a fastener 10 which is adapted for assembly onto the edge of a sheet metal member 12, to enable the member to be attached to a support 14.

The member 12 to which the fastener is to be assembled may be a form of ornamental sheet metal molding having a reverse bend flange portion 16 which is spaced from the main body of the molding, for bearing against the support 14. To provide means for engagement with the fastener 10, the flange 16 is provided with a pair of spaced tabs 18 which extend from the edge of the flange, forming a slot 20 therebetween. Each tab 18 is provided with an end portion 22 which is offset from the plane of the flange toward the main body of the molding, thereby forming an upper shoulder 24 facing the end portion and a lower shoulder 26 facing away from the end portion.

The fastener 10 comprises generally an attaching plate 28 having a bolt 30 mounted therein so as to extend substantially perpendicular from the plate. The plate 28 is provided with an offset portion 32 along one edge thereof which corresponds generally in shape to the offset portion of the tabs 18, so that the plate can seat against the under side of the flange 16. To provide means for engagement with the ends of the tabs, a pair of hook members 34 are provided on the offset edge of the plate, which are bent upwardly and back to terminate in a free end disposed in spaced relation to the plane of the offset portion 32 of the plate, to receive the ends of the tabs 18 therebetween.

To retain the plate in the hooked-on position, a pair of tongue members 36 are provided on the plate, which extend downwardly below the plane of the plate and then upwardly above the plane of the offset portion 32 of the plate to terminate in upwardly inclined free ends 38.

The fastener is assembled onto the flange by sliding the plate under the flange so that the bolt 30 enters the slot 20, and the hook members 34 hook over the offset end portions of the tabs 18. As the plate is pushed further onto the flange, the tongues 36 pass behind the lower shoulders 26, and the upwardly inclined free ends 38 abut thereagainst to retain the plate in position on the flange. After assembly the hooks 34 and the tongues 36 hold the fastener in position against movement perpendicular to the edge of the flange, and the bolt 30 disposed in the slot 20 prevents movement of the fastener longitudinally of the flange.

The assembly may then be assembled onto a support 14 by means of the bolt 30.

The fastener 10 is adapted for many different types of assemblies, but is particularly useful in situations where the space between the main body of the molding and the flange is too small to permit the use of ordinary nuts and bolts to assemble the molding onto a support.

Although the illustrated molding is provided with tabs extending from the edge of the flange for engagement with the fastener, it will be understood that a molding may be provided with a continuous offset edge along the flange and bolt slots extending into the flange with equally good results.

Since certain obvious modifications may be made in the device without departing from the scope of the invention, it is intended that all matter contained herein be interpreted in an illustrative and not in a limiting sense.

I claim:

1. A fastening device for assembly onto an edge of a panel having an edge portion offset from the plane of the adjacent portion of the panel forming a shoulder spaced from the edge and facing away therefrom, said fastener comprising a substantially flat body having an edge portion offset from the plane of the body to conform generally in shape to the offset edge portion of the panel, a threaded member mounted in the medial portion of the plate and extending upwardly therefrom, spaced reverse bend panel gripping members formed at opposite side edges of the body and extending from said offset edge for gripping the offset edge of the panel, spaced tongue members formed in opposite side edges of the body in spaced relation to the offset edge and extending theretoward for abutting said shoulder on the panel when the fastener is assembled thereon.

2. A fastener assembly, comprising a panel having an edge portion offset from the plane of the panel forming a shoulder facing away from said edge on the lower side of the panel, said panel having a slot disposed therein and extending from the edge, and a fastener assembled onto the panel, said fastener comprising a base plate assembled against the lower side of the panel, a threaded member assembled onto the medial portion of the plate and extending upwardly therefrom through the slot, said plate having a pair of panel edge engaging members extending one edge on opposite sides of the slot in the panel which are bent upwardly and back on themselves engaging the offset edge portion of the panel on opposite sides of the slot, and a pair of tongue members formed in the plate which extend generally toward the edge and have end portions abutting against the inwardly facing shoulder of the panel on opposite sides of the slot therein.

3. A fastener assembly as set forth in claim 2 in which said base plate is provided with an offset edge portion forming a shoulder and conforming generally to the shape of the offset edge portion of the panel, said panel edge engaging members extend from said offset edge, and said tongues are joined to the base plate in spaced relation to the offset edge and extend theretoward beyond the shoulder.

WILLIAM A. BEDFORD, Jr.

References Cited in the file of this patent

UNITED STATES PATENTS

| Number | Name | Date |
|---|---|---|
| 2,230,355 | Kost | Feb. 4, 1941 |
| 2,278,790 | Langmaid | Apr. 7, 1942 |
| 2,382,942 | Murphy | Aug. 14, 1945 |